(12) United States Patent
Deuke et al.

(10) Patent No.: US 10,840,774 B2
(45) Date of Patent: Nov. 17, 2020

(54) SLIP RING SYSTEM AND ELECTRICAL MACHINE HAVING A SLIP RING SYSTEM OF THIS KIND

(71) Applicant: Bayerische Motoren Werke Aktiengesellschaft, Munich (DE)

(72) Inventors: Uwe Deuke, Kirchheim b. Munich (DE); Joachim Maerz, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/236,698

(22) Filed: Dec. 31, 2018

(65) Prior Publication Data

US 2019/0140521 A1    May 9, 2019

Related U.S. Application Data

(63) Continuation of application No. PCT/EP2017/058907, filed on Apr. 13, 2017.

(30) Foreign Application Priority Data

Jul. 1, 2016  (DE) .................. 10 2016 212 008

(51) Int. Cl.
*H02K 9/26*    (2006.01)
*H01R 39/08*   (2006.01)
(Continued)

(52) U.S. Cl.
CPC .......... *H02K 9/26* (2013.01); *B01D 46/2403* (2013.01); *H01R 39/08* (2013.01); *H01R 39/38* (2013.01);
(Continued)

(58) Field of Classification Search
CPC . H02K 9/26; H02K 9/28; H01R 39/08; H01R 39/38
(Continued)

(56) References Cited

U.S. PATENT DOCUMENTS 2,063,743 A * 12/1936 Kamrath ................ B01D 46/24
                                                    55/524
2,492,753 A    12/1949 Linville et al.
(Continued)

FOREIGN PATENT DOCUMENTS

CN    102324677 A    1/2012
CN    103780021 A    5/2014
(Continued)

OTHER PUBLICATIONS

International Search Report (PCT/ISA/210) issued in PCT Application No. PCT/EP2017/058907 dated Jun. 23, 2017 with English translation (four (4) pages).
(Continued)

*Primary Examiner* — Terrance L Kenerly
(74) *Attorney, Agent, or Firm* — Crowell & Moring LLP

(57) ABSTRACT

A slip ring system for an electrical machine, comprising: slip rings, which are arranged so as to rotate about an axis of rotation, for transmitting current to the electrical machine; contact brushes which are in contact with the slip rings; an impeller which is mountable so as to surround the axis of rotation and in a rotationally fixed manner in relation to the slip rings, the impeller being adapted to generate an air flow in a plane perpendicular to the shaft; and a filter which surrounds the impeller such that an imaginary radial extension of the impeller meets the filter, and a porosity of the filter decreases in a radially outward direction between a radially inner edge of the filter and a radially outer edge of the filter;
(Continued)

wherein a first thickness of the filter in a radial direction is at least 50% of a second thickness of the filter in an axial direction.

12 Claims, 6 Drawing Sheets

(51) Int. Cl.
    *H01R 39/38*     (2006.01)
    *H02K 9/28*     (2006.01)
    *B01D 46/24*     (2006.01)
    *H02K 13/00*     (2006.01)

(52) U.S. Cl.
    CPC .............. *H02K 9/28* (2013.01); *H02K 13/003* (2013.01); *B01D 2275/206* (2013.01); *B01D 2275/305* (2013.01); *B01D 2279/45* (2013.01); *H02K 2213/06* (2013.01)

(58) Field of Classification Search
    USPC ....................................................... 310/228
    See application file for complete search history.

(56) References Cited

U.S. PATENT DOCUMENTS

| | | | |
|---|---|---|---|
| 4,842,739 A | 6/1989 | Tang | |
| 5,296,772 A * | 3/1994 | Bradfield | ............... H01R 39/38 310/239 |
| 2004/0084992 A1 * | 5/2004 | Finkenbinder | .......... F04D 25/06 310/239 |
| 2008/0001493 A1 | 1/2008 | Braml et al. | |
| 2009/0022942 A1 * | 1/2009 | Hiramatsu | ......... B01D 46/2429 428/116 |
| 2014/0111040 A1 * | 4/2014 | Badafem | ................ H02K 5/148 310/51 |
| 2015/0054362 A1 | 2/2015 | Bulatow et al. | |
| 2016/0263510 A1 * | 9/2016 | Jensen | ............... B01D 46/0035 |
| 2020/0214522 A1 * | 7/2020 | MacLean | ................ A47L 9/122 |

FOREIGN PATENT DOCUMENTS

| | | |
|---|---|---|
| CN | 104247169 A | 12/2014 |
| CN | 204885755 U | 12/2015 |
| DE | 873 277 C | 4/1953 |
| DE | 11 54 863 B | 9/1963 |
| DE | 2 035 723 | 1/1972 |
| DE | 38 78 347 T2 | 7/1993 |
| DE | 10 2006 050 154 A1 | 4/2008 |
| DE | 10 2012 203 098 A1 | 4/2013 |
| DE | 10 2013 111 657 A1 | 4/2014 |
| JP | 3323994 B2 | 9/2002 |
| JP | 2010-119258 A | 5/2010 |

OTHER PUBLICATIONS

German-language Written Opinion (PCT/ISA/237) issued in PCT Application No. PCT/EP2017/058907 dated Jun. 23, 2017 (six (6) pages).

German-language Search Report issued in counterpart German Application No. 102016212008.5 dated Mar. 3, 2017 with partial English translation (13 pages).

Chinese-language Office Action issued in counterpart Chinese Application No. 201780036092.0 dated Sep. 2, 2019 with English translation (16 pages).

\* cited by examiner

SLIP RING SYSTEM AND ELECTRICAL MACHINE HAVING A SLIP RING SYSTEM OF THIS KIND

CROSS REFERENCE TO RELATED APPLICATIONS

This application is a continuation of PCT International Application No. PCT/EP2017/058907, filed Apr. 13, 2017, which claims priority under 35 U.S.C. § 119 from German Patent Application No. 10 2016 212 008.5, filed Jul. 1, 2016, the entire disclosures of which are herein expressly incorporated by reference.

BACKGROUND AND SUMMARY OF THE INVENTION

The invention relates to a slip ring system for transmitting current to an electrical machine and to an electrical machine having a slip ring system of this kind.

Numerous slip ring current transmission systems are known from the prior art. These slip ring systems are subject to the known problem that the contact brushes which rub against the slip rings wear and the brush dust generated thereby is accumulated in the electrical machine or in the region of the slip ring system. When using current-excited electrical machines in motor vehicles, there is a major requirement to eliminate or at least alleviate the problem in terms of brush dust. This applies in particular if the slip ring system has to be encapsulated on account of the environmental conditions (for example mounting below the fording depth) and access for maintenance/cleaning is not possible, with said system thus having to be designed for life.

An object of the invention is to provide a slip ring system which has improved properties in terms of brush dust deposits.

This and other objects are achieved by a slip ring system and an electrical machine having the slip ring system in accordance with embodiments of the invention.

According to one exemplary embodiment of the invention, a slip ring system for an electrical machine is provided, having slip rings, which are arranged such that they can rotate about an axis of rotation, for transmitting current to the electrical machine; contact brushes which are in contact with the slip rings; an impeller which can be mounted so as to surround the axis of rotation and in a rotationally fixed manner in relation to the slip rings and is adapted to generate an air flow in a plane perpendicular to the shaft, and a filter which surrounds the impeller such that an imaginary radial extension of the impeller meets the filter. By means of this exemplary embodiment there is created a slip ring system in which brush dust is transported away by virtue of the suction generated by the impeller, which is likewise arranged on the shaft, and transported directly to a filter. As a result of the impeller assigned exclusively to the slip ring/contact brush combination, the brush dust is not transported through the interior of an electrical machine, on the one hand, and, on the other hand, as a result of the direct assignment, an optimum or higher suction for transporting away the brush dust can be achieved with comparatively simple measures. The impeller is driven directly by the rotation of the shaft and generates a circulation flow in the housing of the slip ring system. By arranging the impeller on the shaft on which the slip rings are also arranged, the brush dust is removed from the point of origin and embedded in the filter.

According to a further exemplary embodiment of the invention, a porosity of the filter changes as seen in a radial direction. It is expected to be possible with the slip ring system according to the invention to achieve a life which corresponds to a vehicle life, for example 300,000 km and more. In a desired manner, it is thus not required to replace or to clean the filter during a vehicle life. This is also achieved by the fact that the filter has a different porosity as seen in the radial direction. This avoids a situation in which the filter is clogged by brush dust in the outer region and the take-up of further brush dust thus becomes more difficult. The different porosity can ensure that, at the start of the life, the brush dust is carried deep into the interior of the filter and the filter thus fills from the inside to the outside with brush dust. The result is that the life of the filter is extended without having to clean it.

This is advantageously achieved in that the porosity of the filter becomes finer in a radially outward direction.

According to a further exemplary embodiment of the invention, the filter extends around the impeller as a closed ring or in the form of annular arc portions.

According to a further exemplary embodiment of the invention, the impeller is arranged between two adjacent slip rings.

According to a further exemplary embodiment of the invention, the impeller has two disk-shaped side walls which surround the shaft and between which a plurality of vanes extend. As a result, the brush dust within an impeller which is laterally substantially closed by side walls is transported away and directly introduced into the filter, which is situated in the immediate vicinity of the outer edge, thereby preventing the brush dust from swirling around.

According to a further exemplary embodiment of the invention, the slip ring system is designed in such a way that the side walls of the impeller have suction openings at their radially inner end and the impeller has outlet openings at its radially outwardly directed side; in particular, the impeller is continuously closed apart from its suction openings, outlet openings and its side directed toward the shaft. As a result, the impeller has defined suction openings in the region of the slip rings and outlet openings which carry the dust directly into the filter. Contamination of the remaining housing interior can thus be reduced or avoided.

According to a further exemplary embodiment of the invention, the suction openings of one of the side walls are arranged offset in relation to the suction openings of the other of the side walls in the circumferential direction of the shaft. By virtue of the suction openings being offset in the circumferential direction, a situation is avoided in which a continuously open path is formed along the shaft. The impeller is thus well suited as an electrical insulator between the slip rings. If the suction openings were not offset in the circumferential direction, it would then be the case that, as a result of suction openings arranged in a line along the shaft, an open path would be formed along the shaft via which, possibly assisted by brush dust, a short circuit or sparking could form.

According to a further exemplary embodiment of the invention, the impeller is produced from plastic. The plastic design means that the impeller is even better suited as an electrical insulator.

According to a further exemplary embodiment of the invention, the slip ring system further has a slip ring system housing into which a shaft of the electrical machine can be inserted such that a longitudinal axis of the shaft corresponds to the axis of rotation and the shaft is connected to the slip rings in a rotationally fixed manner, wherein the slip ring system housing receives the slip rings, the contact brushes and the impeller.

According to a further exemplary embodiment of the invention, the slip ring system further has a slip ring system housing which receives the slip rings, the contact brushes and the impeller, and a coupling which is adapted to connect a shaft of the electrical machine to the slip rings in a rotationally fixed manner.

According to a further exemplary embodiment of the invention, the slip ring system is designed such that the slip ring system housing is not suitable for receiving an electrical machine rotor-stator arrangement. By virtue of the fact that the slip ring system is arranged in a dedicated slip ring system housing assigned only to the slip ring system and not to the electrical machine, a situation is avoided in which the brush dust swirls through the interior of the electrical machine and possibly contaminates it. Furthermore, effective brush dust removal is realized with comparatively simple measures since, as a result of the direct assignment of the impeller to the slip ring/contact brush combination, the air-guiding paths are short and direct.

Moreover, the invention provides an electrical machine having a slip ring system according to one of the preceding exemplary embodiments, having an electrical machine housing and a slip ring system housing into which or through which the shaft of the electrical machine extends, wherein the slip ring system housing receives at least the contact brushes and the impeller, and the slip ring system housing is provided separately to the electrical machine housing. In particular, coolant guides are provided in the electrical machine housing, these being adapted to cool the electrical machine by use of oil or water.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
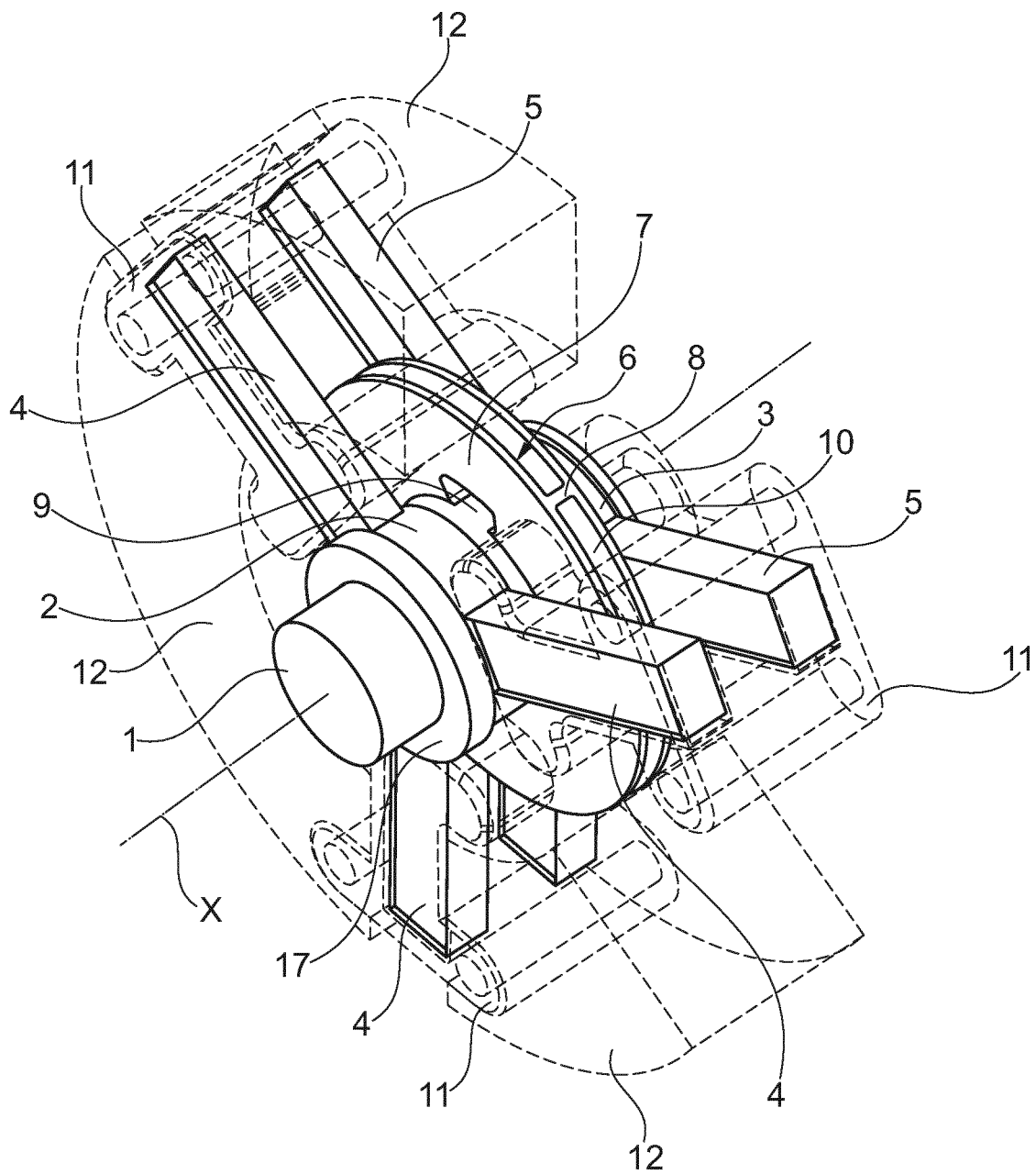
FIG. 1 is a three-dimensional illustration of a slip ring system according to a first exemplary embodiment of the invention.

FIG. 1 shows a three-dimensional illustration of a slip ring system according to a first exemplary embodiment of the invention. A shaft 1 mounted so as to be rotatable in an electrical machine 16 (see FIG. 6) is provided with two slip rings 2, 3. The slip rings 2, 3 serve for current transmission (for example power and/or signal transmission) to the electrical machine and are connected (for example welded, brazed) in a manner that cannot be released without destruction to the shaft 1 or plugged or pressed onto the shaft 1. The shaft 1 is mounted so as to be rotatable about its longitudinal axis, this longitudinal axis corresponding to an axis of rotation X. The slip rings 2, 3 are thus arranged rotationally about the axis of rotation X, the center of the slip rings 2, 3 lying on the axis of rotation X.

In the manner that has already been mentioned, the slip rings 2, 3 can be connected directly to the shaft 1 or there can be provided a sleeve 17 which is connected (for example welded, brazed) in a manner that cannot be released without destruction to the shaft 1 or which is plugged or pressed onto the shaft 1 and on which in turn the slip rings 2, 3 are fastened (for example welded, brazed) in a manner that cannot be released without destruction. The sleeve 17 is thus connected to the shaft 1 and the slip rings 2, 3 in a rotationally fixed manner. The sleeve 17 is substantially cylindrical with a constant inside diameter over the entire length and fully circumferentially surrounds a portion of the shaft 1. The outside diameter can be increased at both longitudinal ends in order to form edges. The sleeve 17 can be arranged between the two slip rings 2, 3 and the shaft 1 or it can be arranged only between one of the two slip rings 2, 3 and the shaft 1. The sleeve 17 is made of an electrical insulator and performs an electrical insulating function, since at least one of the slip rings 2, 3 must not contact the shaft 1 in an electrically conducting manner. However, this insulating function can also be achieved by comparable measures, such as, for example, an appropriate coating of at least one of the slip rings 2, 3 on its inner side. These slip rings 2, 3 form, together with contact brushes 4, 5, sliding contacts for the stated current transmission. The contact brushes 4 (for example three of them) are arranged offset in the circumferential direction of the slip ring 2, preferably at the same distance from one another. The contact brushes 5 are likewise arranged offset in the circumferential direction of the slip ring 3, preferably at the same distance from one another. Between the two slip rings 2, 3, an impeller 6, in particular a radial fan impeller, is directly arranged on the shaft 1 or mounted thereon and connected to the shaft 1 and the slip rings 2, 3 in a rotationally fixed manner. The impeller 6 can also be connected to the shaft 1 by way of the optional sleeve 17, that is to say that the impeller 6 can be fastened on the sleeve 17 and thus be connected to the shaft 1 and the slip rings 2, 3 in a rotationally fixed manner.

The impeller 6 has two side walls 7 which surround the shaft 1 in the manner of disk rings and between which vanes 8 are formed. The impeller 6 is preferably produced from an electrical insulator, for example plastic (thermoset, thermoplastic, etc.) and serves, when arranged between the slip rings 2, 3, as an electrical insulator between the two slip rings. The impeller 6 should advantageously consist of a material which is suitable for withstanding temperatures up to 200° C. The impeller 6 is configured to generate an air flow in a plane perpendicular to the shaft 1. This air flow includes, in particular, an air flow in a radial direction, that is to say in a direction radially outward from the shaft 1, and a tangential direction, that is to say in a direction along a tangent with respect to the circumference of the impeller 6. Suction openings 9 are provided on the side of the impeller 6 that faces the shaft 1. A plurality of these suction openings are preferably formed in the impeller 6 in a manner distributed in the circumferential direction, in particular at regular distances from one another. The suction openings 9 of the one side wall 7 are arranged mutually offset with respect to the suction openings 9 of the other of the two side walls 7 in the circumferential direction of the impeller 6. The suction openings 9 of the different side walls 7 are preferably offset in such a way that a projection of the suction openings 9 of one of the side walls 7 in a direction parallel to the axial direction of the shaft 1 completely meets material of the other side wall 7 and not (nor even partially) a suction opening 9 of this other side wall 7. In particular, the suction openings 9 of the impeller 6 on a plus and a minus side with respect to the slip rings 2, 3 are opened in an alternating manner on the plus and the minus side, with the result that a continuous insulating surface is always maintained between the slip rings 2, 3 in each angular position of the impeller 6. Outlet openings 10 are formed on the radially outwardly directed side of the impeller 6. Consequently, the impeller 6 forms air-guiding ducts which are delimited by the side walls 7 and in each case two adjacent vanes 8.

The contact brushes 4, 5 are clamped in or held by holders 11. A filter 12 surrounds the impeller 6 in the circumferential direction. Here, the filter 12 is arranged adjacently to the outer edge of the impeller 6. In this first exemplary embodiment, the filter 12 takes the form of a plurality of (for example three) annular arc portions which, together with the holders 11, result in a closed circular ring. In other words, apart from the interruptions due to the holders 11, the filter 12 fully circumferentially surrounds the impeller 6. The filter 12 is made of a nonwoven fabric, for example. The holders 11 are cut out for the free passage of the impeller 6, these cutouts also allowing throughflow of some of the air flow emanating from the impeller 6.

In order to ensure a life of the filter 12 which is as long as possible, without cleaning or replacement being required, the filter 12 is dimensioned to be relatively large. Here, a thickness in the radial direction preferably substantially corresponds to a thickness in the axial direction. In particular, a thickness in the radial direction corresponds to at least 50%, more preferably to at least 60%, still more preferably to at least 70%, and even more preferably to at least 80%, of the thickness in the axial direction. In addition, there is provision that a porosity of the filter changes as seen in a radial direction, preferably becoming finer or smaller. This change in porosity can be realized, for example, in stepped or continuous manner. Here, the porosity is the ratio of void volume to total volume. For example, in this exemplary embodiment, a porosity of the filter 12 as seen in the radial direction is greater in the first half of the radial thickness than in the second half of the radial thickness.

Figure 2:
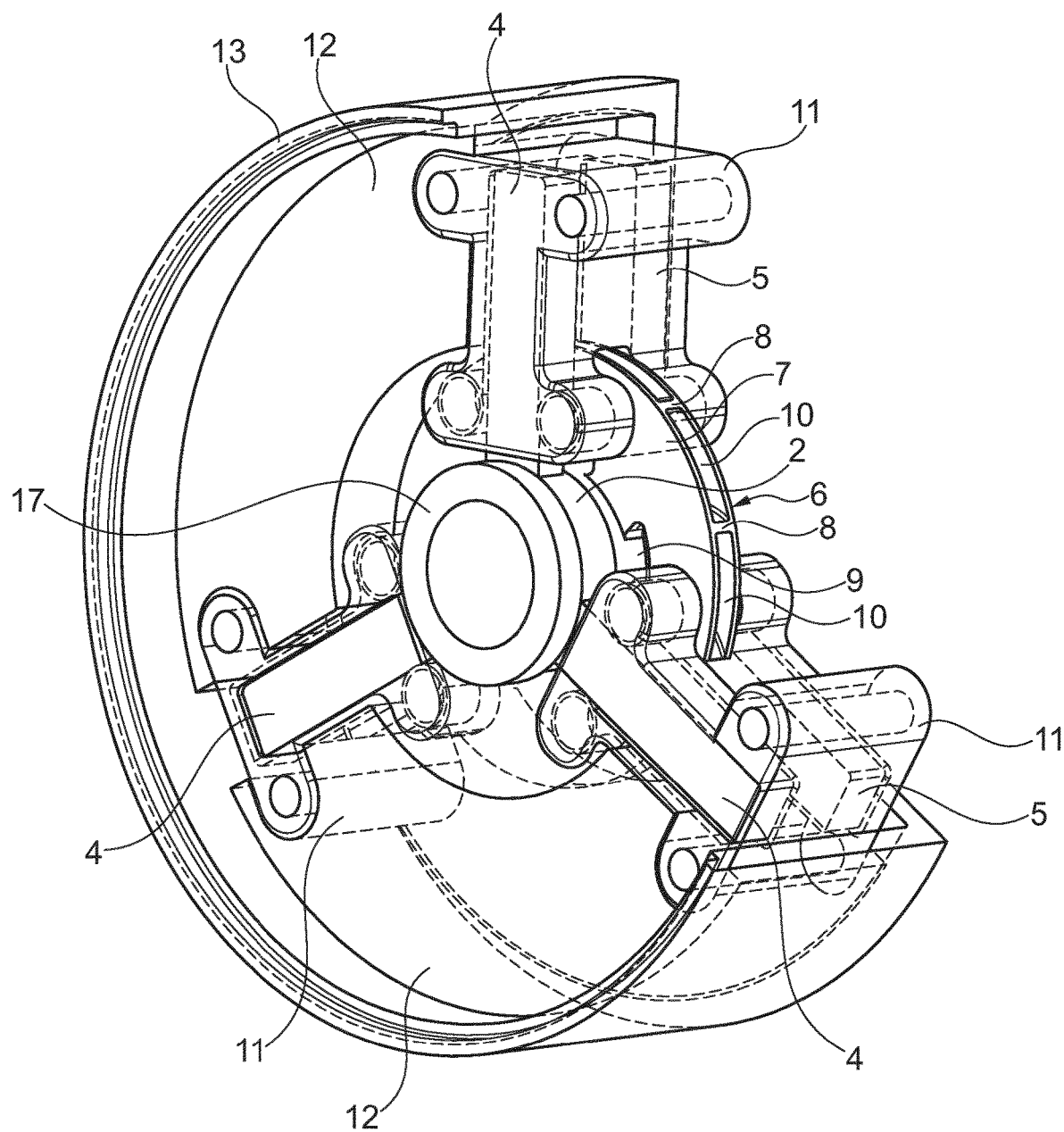
FIG. 2 is another three-dimensional illustration of the slip ring system according to the first exemplary embodiment of the invention.

FIG. 2 shows another three-dimensional illustration of the slip ring system according to the first exemplary embodiment of the invention. FIG. 2 additionally illustrates a wall of a slip ring system housing 13 that extends in the circumferential direction. For reasons of illustration, a front and a rear side of the slip ring system housing 13 have been omitted, but these would extend at both longitudinal ends of the wall illustrated and perpendicularly to the axis of rotation X. Here, a length of the slip ring system housing 13 is smaller than a diameter of the slip ring system housing 13. The wall extending in the circumferential direction is also not fully circumferential, but illustrated as partially cut out. The holders 11 are fixedly connected to the slip ring system housing 13 or fastened thereto. For example, the slip ring system housing 13 could be designed in such a way that it cannot be opened without destruction. The slip ring system housing 13 is preferably designed such that penetration of dirt and/or water can be prevented to the largest possible extent.

Figure 3:
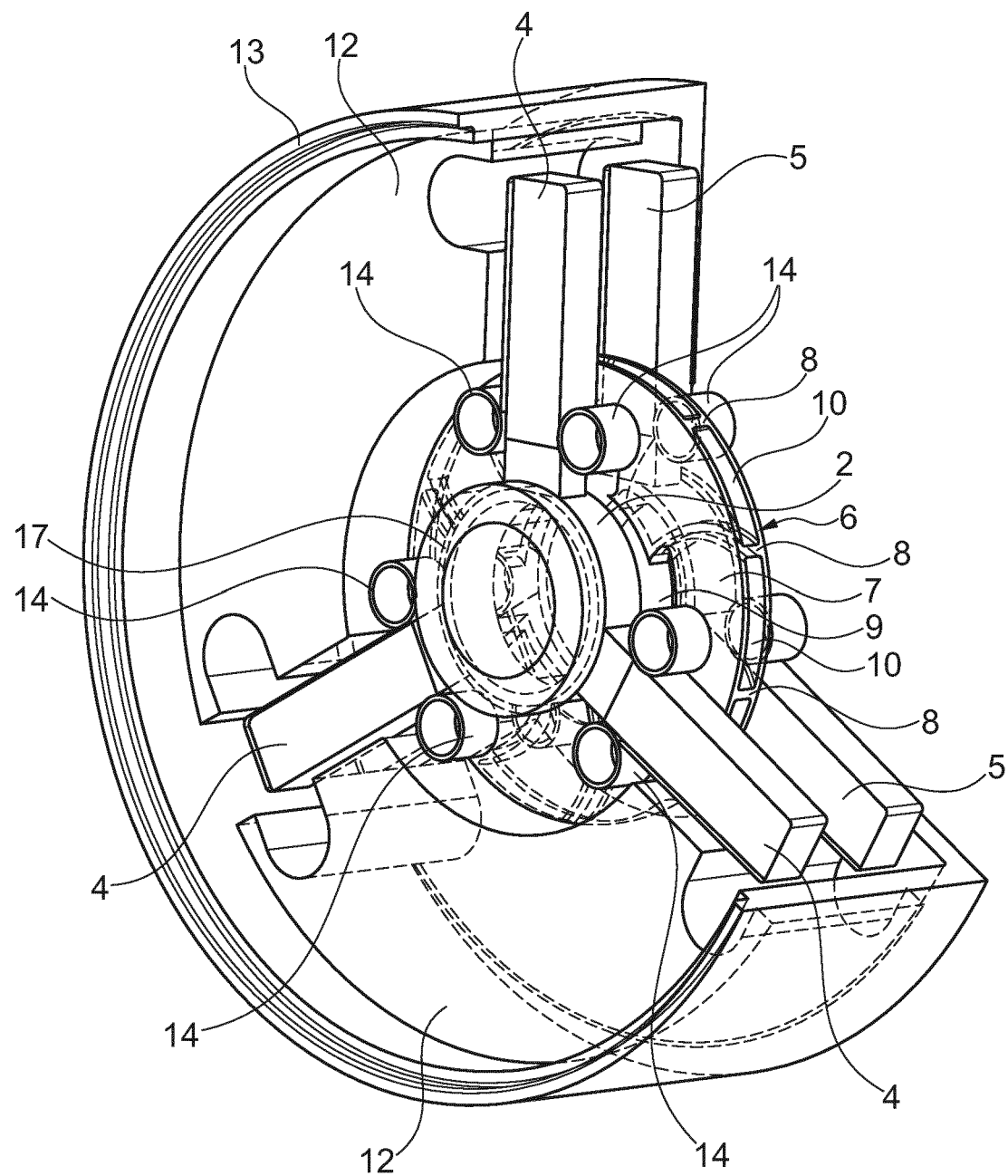
FIG. 3 is a three-dimensional illustration of the slip ring system according to the first exemplary embodiment from the same perspective as FIG. 2.

FIG. 3 shows a three-dimensional illustration of the slip ring system according to the first exemplary embodiment from the same perspective as FIG. 2. For better illustration, the holders 11 have been omitted, by contrast with FIG. 2, in FIG. 3. There can thus be seen springs 14, in particular coiled-strip springs, which are held by the holders 11 and urge or preload the respective contact brushes held by the holders 11 in the radial direction toward the shaft 1 or toward the respective slip rings 2, 3, with the result that good contact is ensured between contact brushes 4, 5 and slip rings 2, 3.

Figure 4:
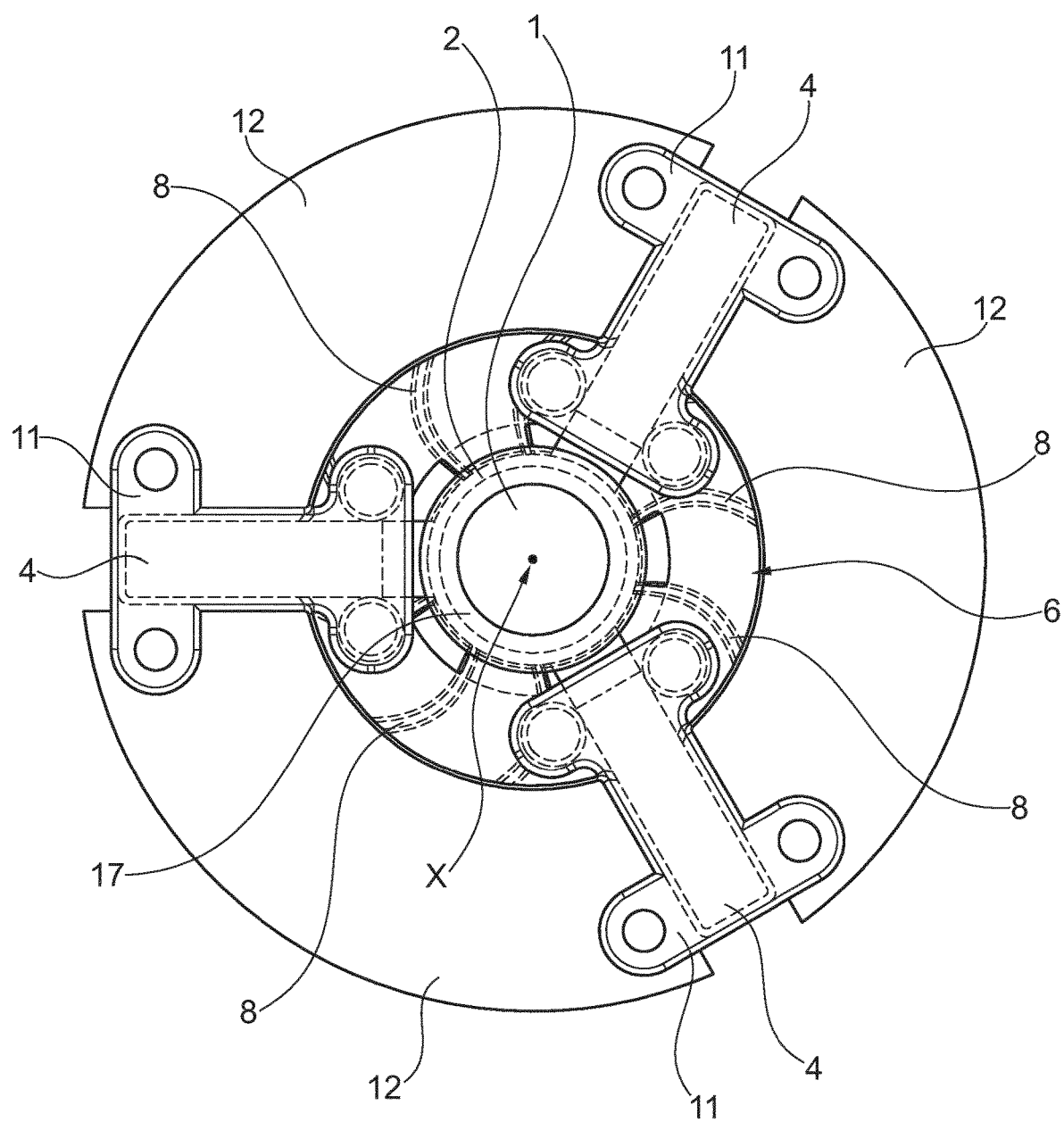
FIG. 4 is an illustration of the slip ring system of the first exemplary embodiment of the invention in a direction of view along the shaft.

FIG. 4 shows an illustration of the slip ring system of the first exemplary embodiment of the invention in a direction of view along the shaft 1. As can be seen, the vanes 8 of the impeller 6 are preferably curved. Here, the vanes 8 form an arc shape of which the curvature points toward the direction of rotation. However, the invention is not limited to this vane shape. Thus, the vanes 8 can also have their curvature pointing away from the direction of rotation. The vanes 8 could also extend in a rectilinear or substantially straight manner.

It has been described above that the slip rings 2, 3 and the impeller 6 are mounted directly on the shaft or the sleeve 17. However, there is also the possibility that a coupling (not shown) is provided by means of which the slip rings 2, 3 and the impeller 6 can be connected to the shaft 1 in a rotationally fixed manner. For example, the coupling is formed in one piece with the sleeve 17 or connected to the sleeve 17 in a rotationally fixed manner, for example by integral bonding, force-fitting connection or form-fitting connection. Furthermore, an end of the shaft 1 can be inserted into this coupling, with the result that a rotationally fixed connection between shaft 1 and coupling is also produced. In this way, the slip ring system housing 13 can be arranged next to the end of the shaft 1 and coupled to the shaft 1 in a simple manner.

Figure 5:
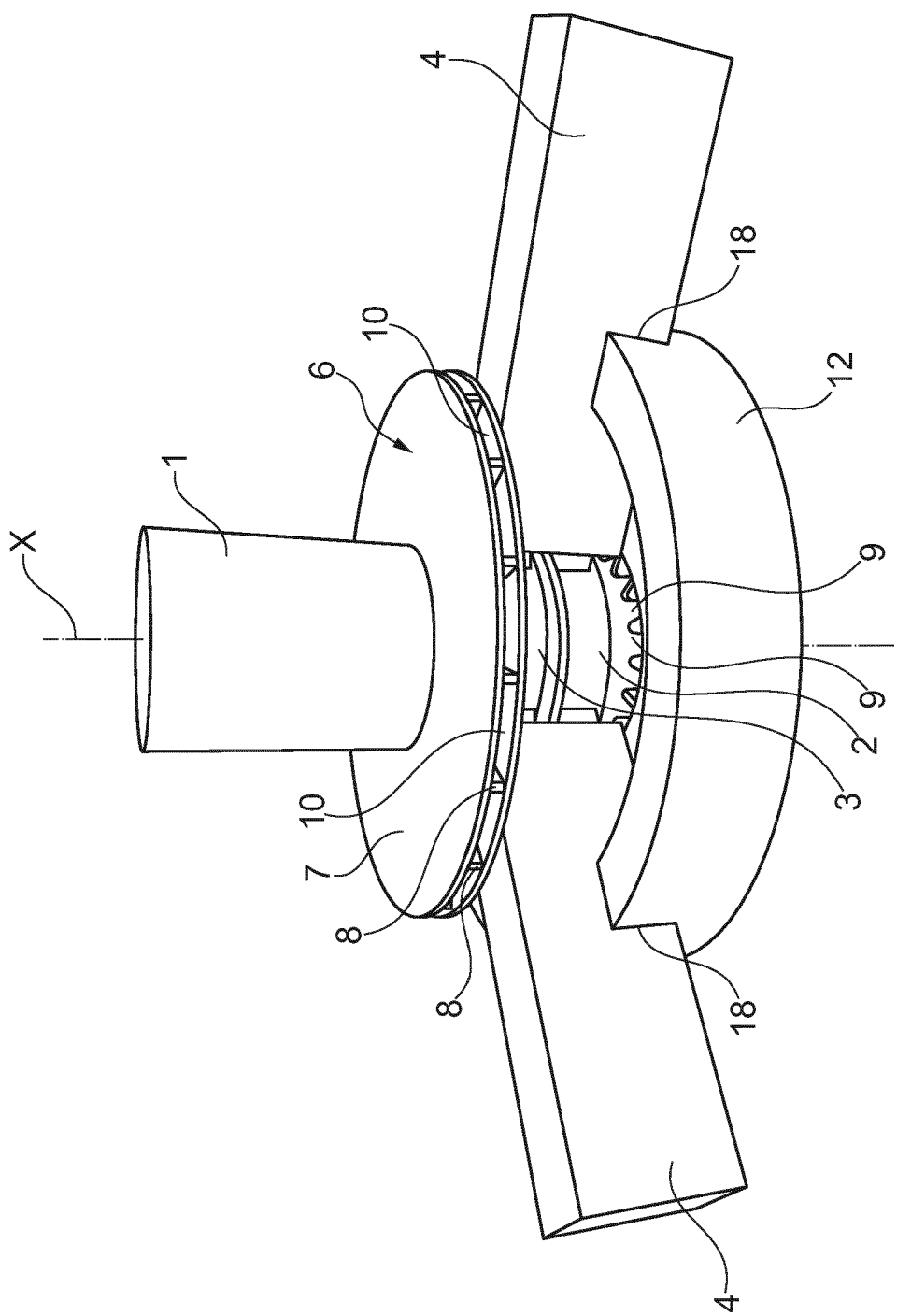
FIG. 5 is a three-dimensional illustration of a slip ring system according to a second exemplary embodiment of the invention.

FIG. 5 shows a three-dimensional illustration of a slip ring system according to a second exemplary embodiment of the invention. In order to avoid repetitions, reference is made to the description of the first exemplary embodiment and only the differences in relation to the first exemplary embodiment are described here. Thus, the filter 12 of the second exemplary embodiment is not interrupted by the holders which hold the contact brushes, but takes the form of a fully circumferentially continuous ring in which there are provided recesses 18 through which the contact brushes or holders can extend. In this case, the filter 12 can be in one piece or in the form of two halves which are divided by a plane of symmetry perpendicular to the shaft 1. By contrast with the first exemplary embodiment, in the second exemplary embodiment there are provided two impellers 6 between which the two slip rings 2, 3 are arranged. Since, in this exemplary embodiment, the impellers 6 are not arranged between the slip rings 2, 3 but next to the slip rings 2, 3, the suction openings 9 are formed only in one of the side walls 7 of each impeller 6. In order to ensure the insulation between the two slip rings 2, 3, what is provided there, instead of an impeller, is a projection of electrical insulating material which protrudes radially outward from the shaft 1 and fully circumferentially surrounds the shaft 1.

Figure 6:
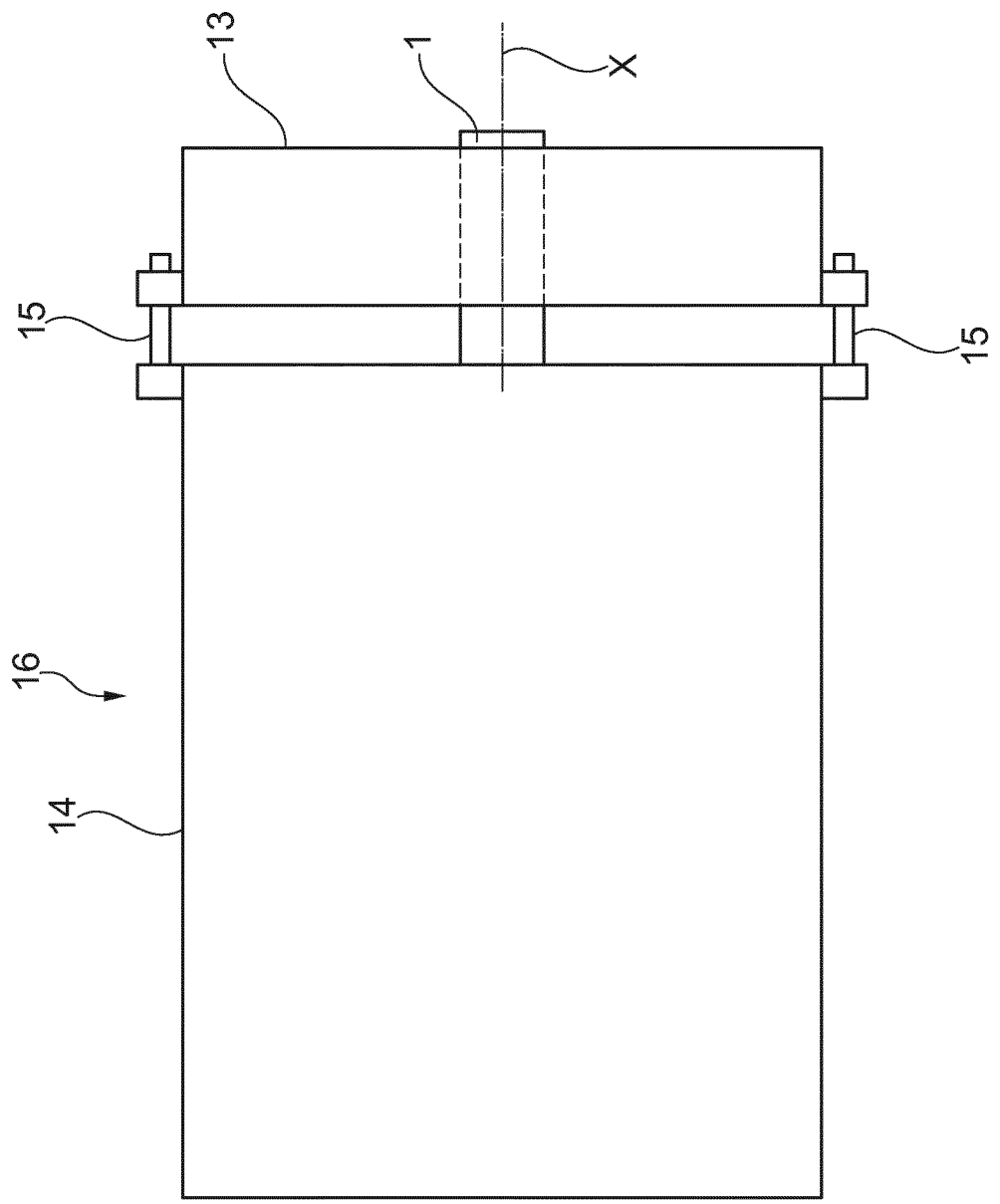
FIG. 6 is a schematic attachment of the slip ring system for an electrical machine.

FIG. 6 shows a schematic attachment of the slip ring system according to the invention to an electrical machine. The shaft 1 on which the slip ring system housing 13 is mounted protrudes from an electrical machine housing 14. The slip ring system housing 13 can be fastened to the electrical machine housing 14 in a releasable manner, for example by means of screw connections 15, or in a manner that cannot be released without destruction. In the electrical machine housing 14 there are provided coolant guides which are adapted to cool the electrical machine by means of oil or water. Other cooling media are also contemplated. A separate air cooling assigned to the electrical machine housing 14 and not to the slip ring system housing 13 would also come into consideration in the case of low motor power. In the case of high motor power and the associated high cooling demand, an air cooling is not expected to come into consideration. It is also contemplated for the electrical machine housing 14 to be formed in one piece with the slip ring system housing 13, but it would then be necessary to provide a partition which separates the slip ring system from the components of the electrical machine and has substantially only one opening for the shaft 1 that is provided with a sealing ring.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A slip ring system for an electrical machine, comprising:
    slip rings, which are arranged so as to rotate about an axis of rotation, for transmitting current to the electrical machine;
    contact brushes which are in contact with the slip rings;
    an impeller which is mountable so as to surround the axis of rotation and in a rotationally fixed manner in relation to the slip rings, the impeller being adapted to generate an air flow in a plane perpendicular to the shaft; and
    a filter which surrounds the impeller such that an imaginary radial extension of the impeller meets the filter, and a porosity of the filter decreases in a radially outward direction between a radially inner edge of the filter and a radially outer edge of the filter.

2. The slip ring system as claimed in claim 1, wherein the filter extends around the impeller as a closed ring or in a form of annular arc portions.

3. The slip ring system as claimed in claim 1, wherein the impeller is arranged between two adjacent slip rings.

4. The slip ring system as claimed in claim 1, wherein the impeller has two disk-shaped side walls which surround the shaft and between which a plurality of vanes extend.

5. The slip ring system as claimed in claim 4, wherein the side walls of the impeller have suction openings at their radially inner end, and
    the impeller has outlet openings at its radially outwardly directed side.

6. The slip ring system as claimed in claim 5, wherein the suction openings of one of the side walls are arranged offset in relation to the suction openings of the other of the side walls in the circumferential direction of the shaft.

7. The slip ring system as claimed in claim 1, wherein the impeller is produced from plastic.

8. The slip ring system as claimed in claim 1, further comprising:
    a slip ring system housing into which a shaft of the electrical machine is insertable such that a longitudinal axis of the shaft corresponds to the axis of rotation and the shaft is connected to the slip rings in a rotationally fixed manner, wherein
    the slip ring system housing receives the slip rings, the contact brushes and the impeller.

9. The slip ring system as claimed in claim 8, wherein the slip ring system housing is configured such that it cannot receive an electrical machine rotor-stator arrangement.

10. The slip ring system as claimed in claim 1, further comprising:
    a slip ring system housing which receives the slip rings, the contact brushes and the impeller; and
    a coupling which is adapted to connect a shaft of the electrical machine to the slip rings in a rotationally fixed manner.

11. The slip ring system as claimed in claim 10, wherein the slip ring system housing is configured such that it cannot receive an electrical machine rotor-stator arrangement.

12. An electrical machine, comprising:
    a slip ring system as claimed in claim 1;
    an electrical machine housing; and
    a slip ring system housing into which or through which the shaft of the electrical machine extends, wherein
    the slip ring system housing receives at least the contact brushes and the impeller, and the slip ring system housing is provided separately to the electrical machine housing.

* * * * *